United States Patent
Chambers et al.

[11] Patent Number: 5,841,203
[45] Date of Patent: Nov. 24, 1998

[54] AUTOMATIC HEADLAMP ACTIVATION SYSTEM FOR MOTOR VEHICLES

[76] Inventors: Kevin K. Chambers, P.O. Box 627, Anchor Point, Ak. 99556; Robert A. Baker, 160 NW. 10th St., Cedaredge, Colo. 81413

[21] Appl. No.: 427,351

[22] Filed: Apr. 24, 1995

[51] Int. Cl.[6] .................................................. B60Q 1/26
[52] U.S. Cl. .............................. 307/10.8; 315/80; 315/83
[58] Field of Search ................................. 307/10.1, 10.8; 315/77–80, 82, 83; 362/61, 802; 439/34, 36; 340/457.2, 458, 468, 469

[56] References Cited

U.S. PATENT DOCUMENTS

| | | | |
|---|---|---|---|
| 3,769,519 | 10/1973 | Adamian | 307/10 |
| 4,009,363 | 2/1977 | Binegar | 307/10.8 |
| 4,686,423 | 8/1987 | Eydt | 315/82 |
| 4,713,584 | 12/1987 | Jean | 315/82 |
| 4,983,883 | 1/1991 | Roland | 315/77 |
| 5,030,884 | 7/1991 | Roussey et al. | 315/83 |
| 5,075,593 | 12/1991 | Shoda | 315/82 |
| 5,081,565 | 1/1992 | Nabha et al. | 307/10.8 |
| 5,182,494 | 1/1993 | Segaud | 307/10.8 |
| 5,187,383 | 2/1993 | Taccetta | 307/10.8 |
| 5,202,581 | 4/1993 | Moore | 307/10.8 |
| 5,235,250 | 8/1993 | Cronk | 315/82 |
| 5,245,251 | 9/1993 | Irick | 315/82 |

*Primary Examiner*—Richard T. Elms
*Attorney, Agent, or Firm*—Waddey & Patterson; Mark J. Patterson

[57] ABSTRACT

A system is described for causing automatic activation of vehicle low beam headlamps. Three voltage sensors, including a voltage slope detector for sensing engine start-up, cause activation whenever the engine is running. Separate master and slave modules allow for retrofit installation using the vehicle's existing wiring harness. Cables and cable connectors connect the system directly to the headlamp wiring harness, headlamp base, and vehicle battery without the need for splicing. The system can be bypassed or overridden by operation of the vehicle's standard headlamp switch.

25 Claims, 7 Drawing Sheets

AUTOMATIC HEADLAMP ACTIVATION SYSTEM FOR MOTOR VEHICLES

BACKGROUND OF THE INVENTION

The present invention relates generally to devices and systems which will automatically activate and de-activate motor vehicle headlamps under pre-set conditions and more particularly to a system which is easily installed in motor vehicles as an after market kit, to automatically activate headlamp low beams when the vehicle engine is running.

Although motor vehicle headlamps are intended primarily to provide nighttime illumination for driver visibility, they also increase the visibility of the motor vehicle to others when the headlamps are turned on. In fact, transportation safety studies have clearly shown that the daytime motor vehicle accident rate declines for that group of motor vehicles which operate in the daytime with their headlamps turned on. For that reason, automobile manufacturers have begun to factory equip their motor vehicle products with headlamp activation systems, integrated with conventional headlamp switches, which will automatically turn on at least the headlamp low beams when the vehicle is being operated, turning them off when the vehicle engine is turned off. Unfortunately, there are millions of automobiles on the road today which could benefit from the enhanced visibility and safety offered by daytime headlamp operation. These existing vehicles do not have factory installed automatic activation systems and their owners are reluctant to rely on manual headlamp activation because of the fear that they will inadvertently leave the headlamps on after the vehicle is stopped, thereby draining the battery. Also, they will often forget to turn the headlamps on when they start the car up.

To address the needs of motor vehicles which do not have factory installed automatic headlight activation systems, several devices have been developed in the prior art which claim to be usable as aftermarket devices which, after being installed, will automatically energize vehicle headlamps when the vehicle engine is running. For example, U.S. Pat. No. 4,983,833 issued to Roland on Jan. 8, 1991, describes an automatic headlight activation circuit which causes at least one headlight on the vehicle to operate whenever the engine is running, independent of vehicle motion or operation of the headlight switch. However, the system described in the '883 patent is deficient in several respects. First, the system activates the headlights in response to operation of the ignition switch, requiring a more complex retrofit installation procedure than is preferred. Second, the determination of when the vehicle headlamps are to be automatically turned on or turned off is made solely by reference to an absolute voltage with the level being set by a resistor 42. This, however, is not a reliable way of consistently determining whether a motor vehicle engine is turned on because of the variability in electrical system voltage, charging operation, and the like, found in the various types of vehicles and vehicles of varying ages.

Another daytime running light circuit is described by Roussey in U.S. Pat. No. 5,030,884 issued Jul. 9, 1991. The Roussey system, however, actually operates the headlamp at reduced intensity during the daytime, requires more complex installation than is preferred because it must tap into a variety of electrical connections in the vehicle engine compartment, and like the Roland device, does not provide optimal reliability in the sensing of vehicle engine operation.

Further, in U.S. Pat. No. 4,686,432 issued to Eydt on Aug. 11, 1977, another automatic headlight activation system is described which can be installed in an existing motor vehicle headlamp circuit. The Eydt system has several drawbacks, particularly as applied to new automobiles. First, the circuitry of the Eydt system does not provide for complete isolation of the Eydt device from the vehicle's existing circuitry. This is important for those vehicles which use solid state control technology and therefore may be sensitive to extraneous signals and pulses introduced into the vehicle's electrical system. Second, the method of engine operation detection using the Eydt system relies, again, on a comparison to a reference voltage which does not allow for optimal reliability if the system is to be installed in a wide variety of existing motor vehicles.

Also, the Eydt system does not provide for complete disengagement of the automatic low beam activation by the system when the vehicle's high beam headlamps are operated. Finally, Eydt does not describe a system which combines the necessary mechanical and electrical features which render it easy for a do-it-yourselfer to install the system in his or her automobile.

What is needed, then, is an automatic motor vehicle headlamp activation system which can be easily installed in existing motor vehicles to function cooperatively with existing headlight activation systems installed by the factory, without interfering with high beam headlamp operation or the functioning of the vehicle's electrical system as a whole. Such a system is not found in the prior art.

SUMMARY OF THE INVENTION

One objective of present invention is to provide a headlamp activation system form which can be easily installed in existing vehicles with a minimum of electrical connections.

A further object of the invention is provide a headlamp activation system in kit form which can connect directly and without modification to the vehicle's existing headlamp wiring harness.

Another object of the present invention is to provide a headlamp activation system that can reliably detect vehicle engine start-up so that the low beam headlamps are activated whenever the engine is operating.

A further object of the invention is to allow the vehicle owner to easily bypass the headlamp activation system or to override its operation using the standard headlamp switch.

To carry out these and other objectives which will become apparent below, a novel automatic headlamp activation system is described which is mechanically implemented in two unobtrusive sections, a master module containing the control circuitry and a solid state switch and slave module containing another solid state switch. A first voltage sensor in the control circuit functions as a slope detector, to determine when the engine has been started. A second voltage sensor detects when the vehicle's charging system has begun normal operation after engine start-up. A third voltage sensor acts as a back-up activation switch by sensing when the battery voltage has risen to a point where the charging system has been operational after engine start-up.

An override circuit allows the vehicle operator to activate the headlamp high or low beams independent of the system. A bypass switch disables the system completely.

Connectors and cables supplied with the system allow it to be connected directly to the existing headlamp wiring harness and headlamp base connectors on the vehicle.

DESCRIPTION OF THE PREFERRED EMBODIMENT

Figure 1:
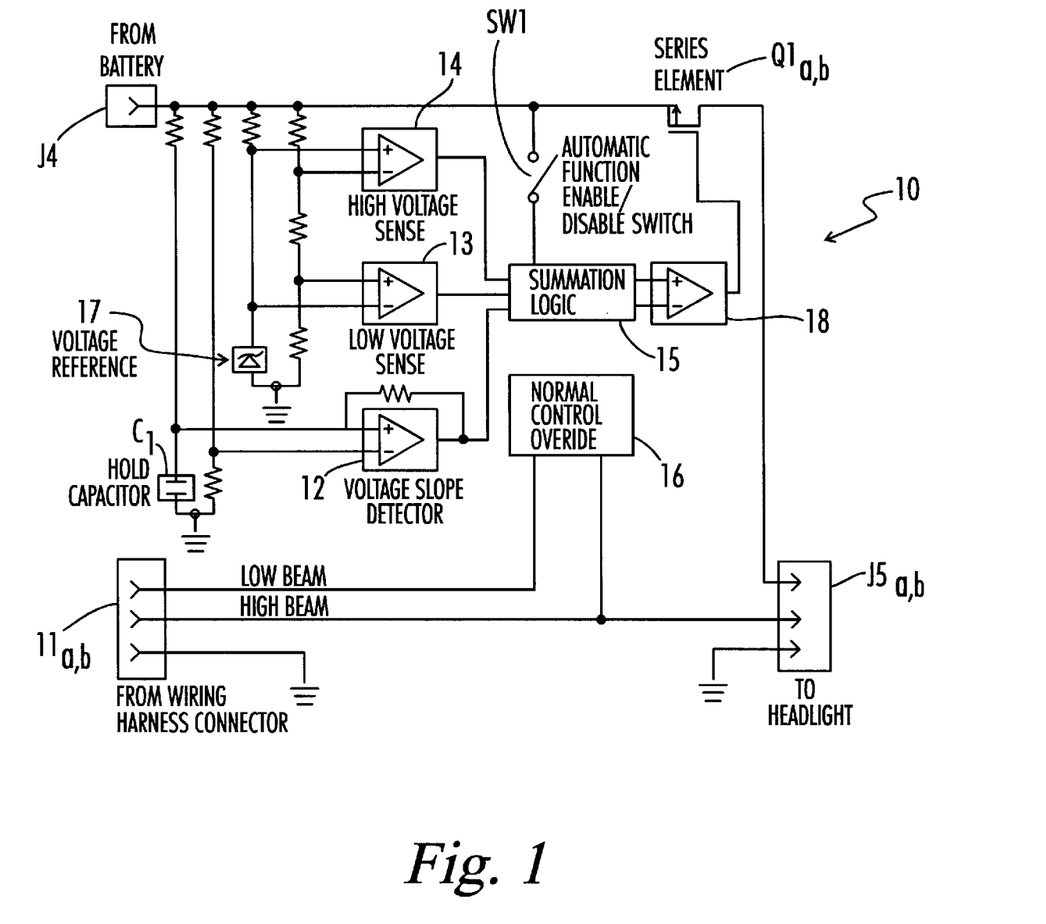
FIG. 1 is a block diagram showing generally a preferred operational interconnection of the electronic sub-systems of the automatic headlamp activation system of the present invention.

FIG. 1 is a block diagram showing a preferred embodiment of the electronic features of headlamp activation system of the present invention. This system is intended for use as an after-market product, i.e., for installation into motor vehicles which have been manufactured and sold with conventional manual headlamp switches and the like. Accordingly, the system contains novel electrical and mechanical design features which enhance its operational reliability and provide for ease of installation by virtually any vehicle owner.

INSTALLATON

Figure 4A:
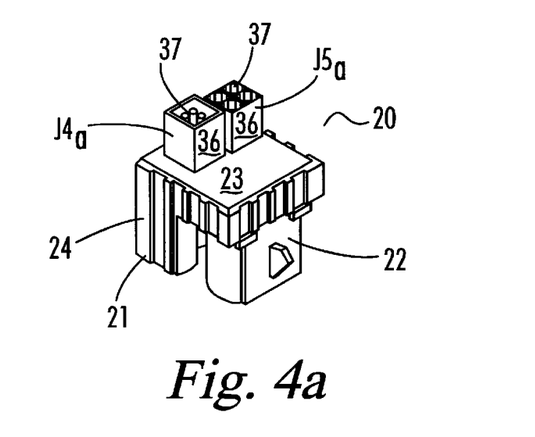
FIGS. 4a and 4b are perspective views of the slave module housing for use in the first and second embodiments of the system of the present invention.
Figure 4B:
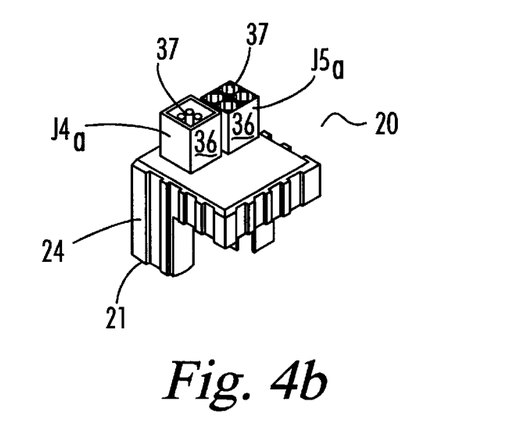
Figure 6:
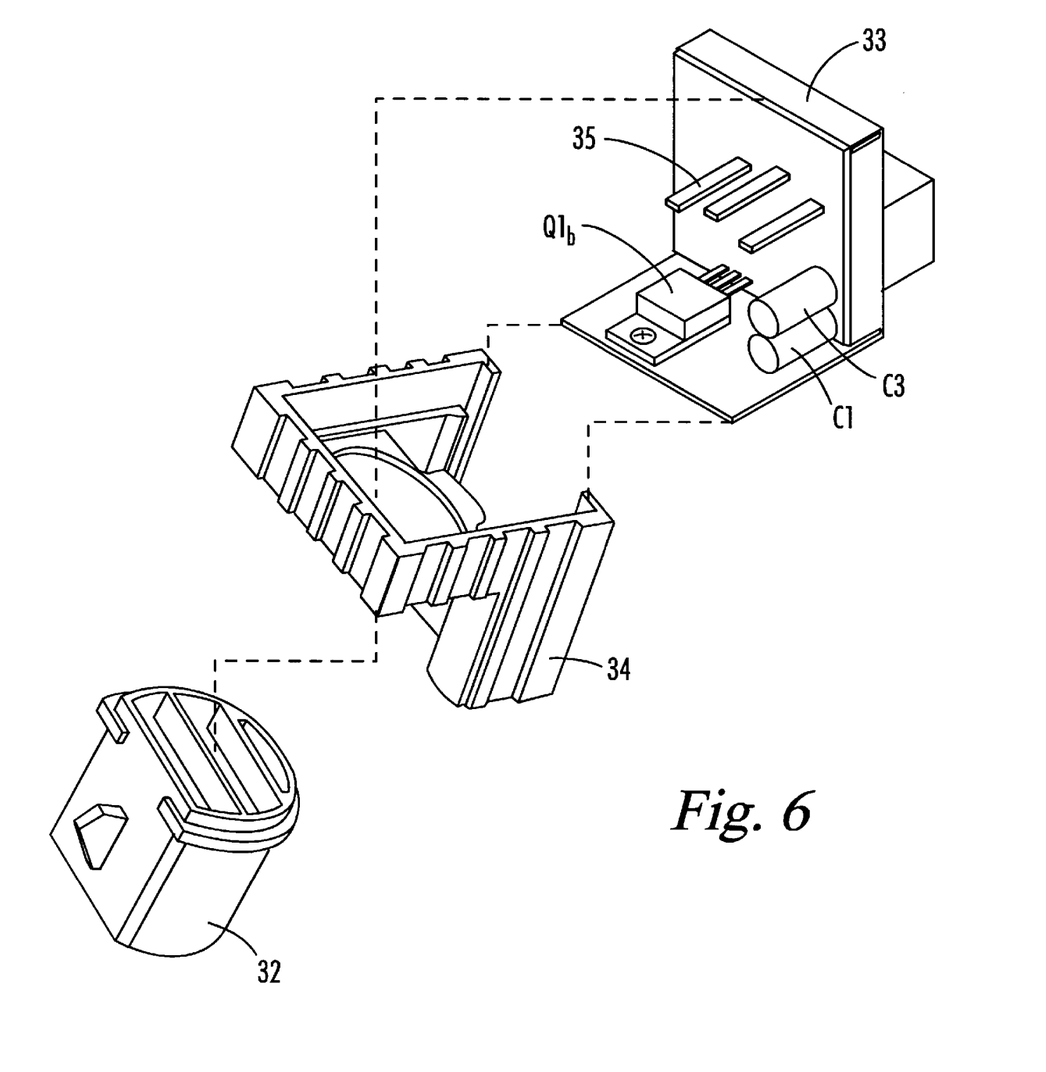
FIG. 6 is an exploded perspective view of the master module housing assembly for use in the first embodiment of the system of the present invention.
Figure 7:
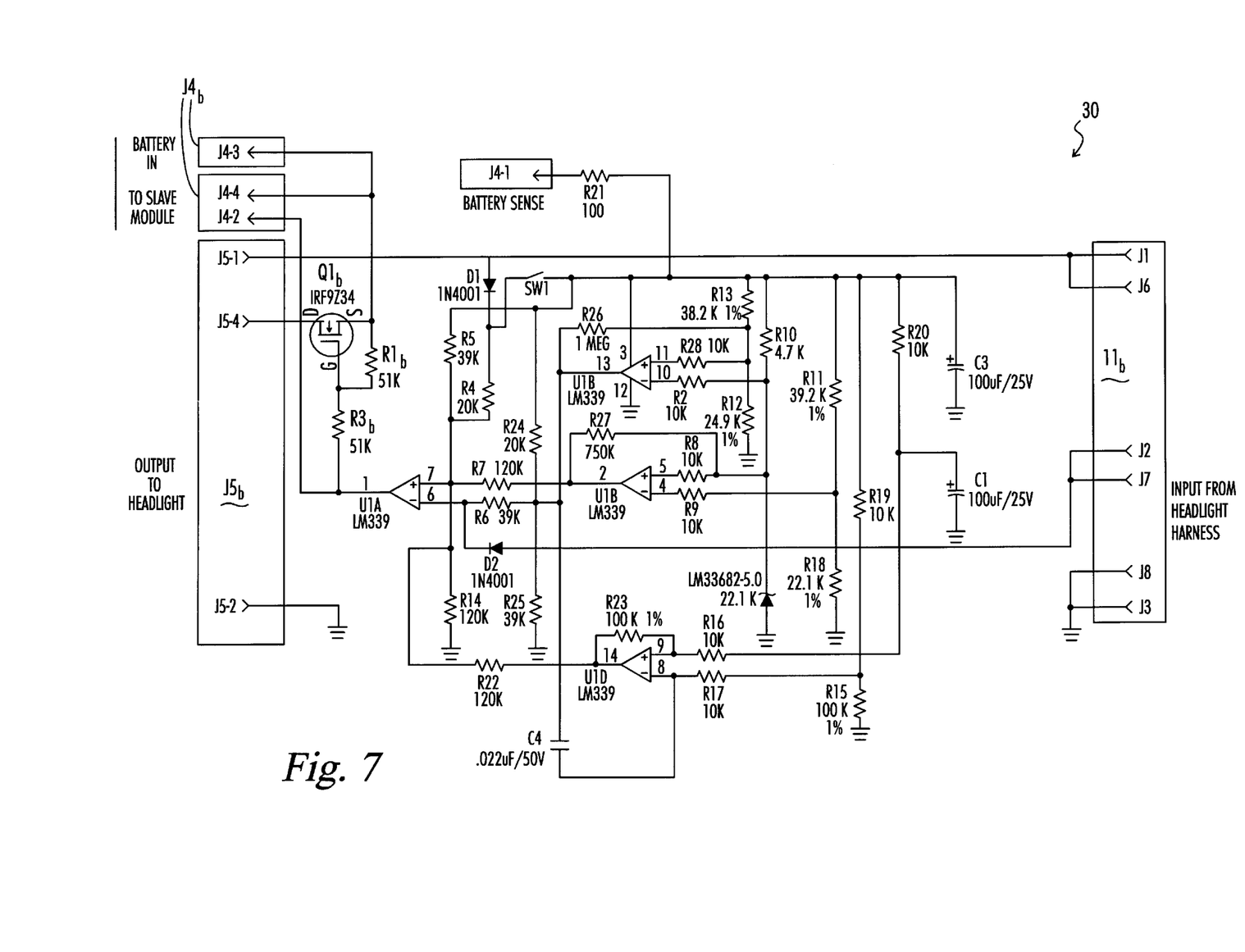
FIG. 7 is a schematic diagram showing a preferred arrangement of the electronic portions of the master module used in the system of the present invention.
Figure 8:
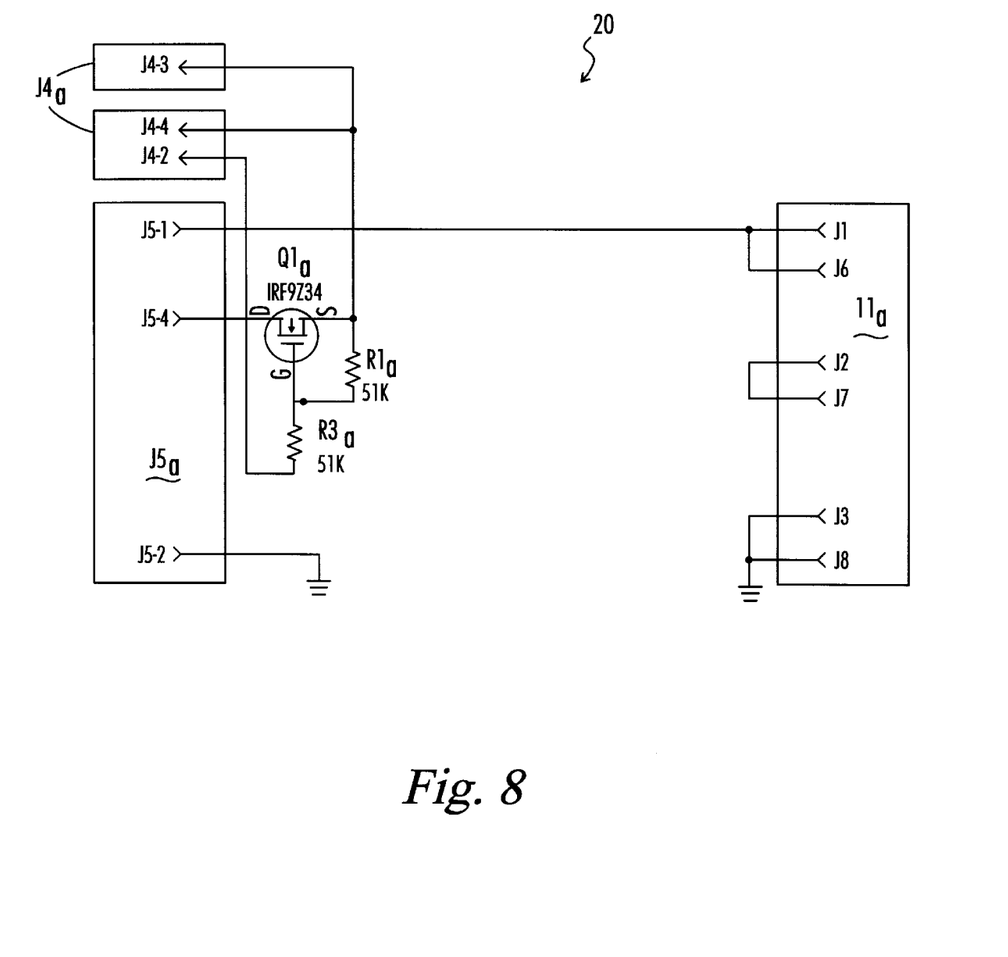
FIG. 8 is a schematic diagram of the slave module used in the system of the present invention.

Preferably, the electronic portions of the system 10 as shown in FIG. 1 will be physically separated into two modules, a slave module 20 which is illustrated mechanically in FIG. 4 and electrically in FIG. 8, and a master module 30 which incorporates the control circuitry and a second electronic switch Q1b, shown in FIGS. 1, 6, and 7.

Figure 9:
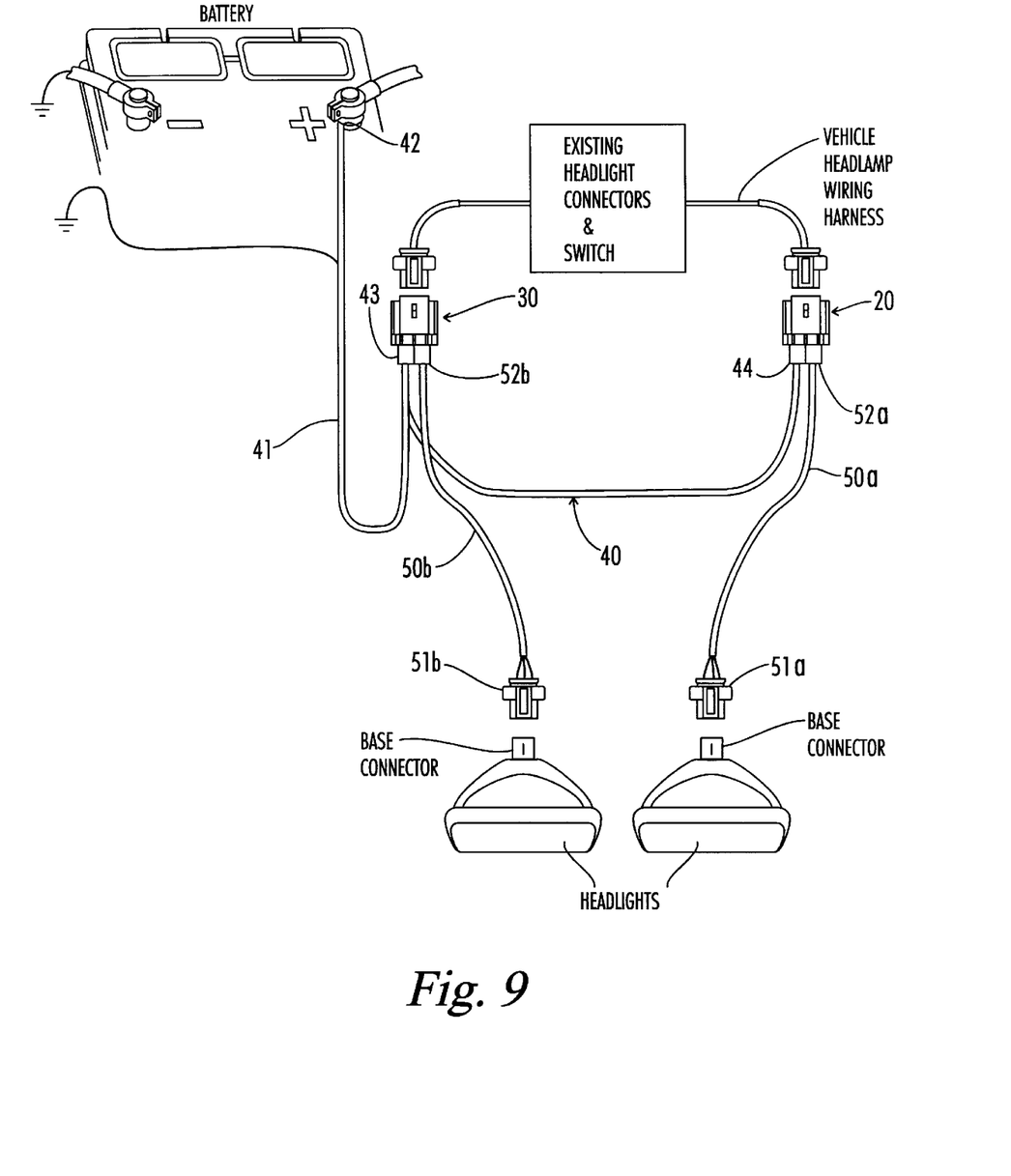
FIG. 9 is a plan view of the system of the present invention as installed as a retrofit item in a vehicle, but with the connectors on headlamp power cables separated from the vehicle headlamp wiring harness and headlamp base connectors.

FIG. 1 schematically represents a preferred arrangement of the electronic portions of the headlamp activation system 10. First, the system 10 is installed as a retrofit item in the vehicle by disconnecting the existing headlamp wiring harness from the base of the vehicle's headlamps (FIG. 9). The headlamp base ends of the vehicle's headlamp wiring harness are then plugged into wiring harness cable input connector 11a on slave module 20 and into input connector 11b on master module 30. This allows system 10 to receive headlamp high beam power and headlamp high and low beam activation signals from the vehicle's conventional headlamp switch (FIG. 1).

System 10 is then connected to each headlamp base, at the same base connectors from where the output connectors (FIG. 9) on the vehicle's headlamp wiring harness have been removed. This is accomplished by plugging in a pair of headlamp power cables 50 supplied with system 10 (FIGS. 5a or 5b), each of which has a headlamp power cable connector 51 at its output end. Each headlamp power cable connector 51 is configured to be an exact replacement for the factory supplied output connectors on the headlamp wiring harness supplied with the vehicle. The input ends of the headlamp power cables 50 include input connectors 52 with are connected to headlamp power output connectors J5a and J5b on slave module 20 and master module 30 respectively.

A control cable 40 (FIG. 2) is included in system 10 to connect a control input of slave module 20 to a control output of master module 30. First control cable connector 43 is attached to control output connector J4b on master module 30 and second control cable connector 44 is attached to control input connector j4a on slave module 20. Finally, power is supplied to system 10 by connecting battery terminal connector 42, which is part of control cable assembly 40, to the ungrounded terminal on the motor vehicle battery (FIG. 1), typically the positive terminal. In this retrofit connection scheme, conventional headlamp switch control of low beam headlamp operation is interrupted and therefore controllable by device 10 with a minimal amount of interconnection to the vehicle's electrical system.

DESCRIPTION OF BASIC FUNCTION AND OPERATION

Referring to FIG. 1, an electronic solid state switch Q1 is connected directly on its supply side to the vehicle's battery power, through control cable connector J4. The load side of switch Q1 connects to the headlamp low beam terminals on headlamp power output cable connector J5 so that any voltage drop or power loss in energizing the low beam headlamps will be minimal. Switching control of electronic switch Q1 is provided by a control circuit which includes a logic circuit 15, a system override circuit 16, and first, second, and third voltage sensors 12, 13, and 14. Preferably, first voltage sensor 12 is configured as a voltage slope detector, to detect a transition in the electrical and battery charging system of the vehicle from the state where the vehicle engine is being started (when battery voltage is temporarily depressed) to a state of higher voltage immediately after the engine has started.

The second voltage sensor 13 uses a voltage reference circuit 17 to determine when the vehicle battery voltage has risen to a level that establishes that the vehicle's battery charging system has begun to function to restore battery charge lost during engine start-up. Thus, in a preferred arrangement of a control circuit for system 10, the combination of vehicle start detection by first voltage sensor 12, followed by sensing of initial proper functioning of the battery charging system as determined by second voltage sensor 13, allows the vehicle low beam headlamps can safely be activated by system 10. A third voltage sensor 14, which also uses voltage reference circuit 17, preferably will check for a higher voltage level associated with continued operation of the battery charging circuit of the vehicle after the engine has been started. Therefore, in the event that due to deficiencies in the charging system of the vehicle, first voltage sensor 12 does not detect the starting of the vehicle, a sufficiently high battery voltage sensed by third voltage sensor 14 can also be used to activate the vehicle's low beam headlamps.

A filtering circuit, including capacitor C1, provides a stabilized or delayed presentation of changes in the vehicle's battery voltage to assist in smooth operation of first voltage sensor 12, as more particularly described below.

The override circuit 16 preferably will perform two functions. First, circuit 16 will sense selection of the low beam headlamps by the conventional headlamp switch in the vehicle and, upon doing so, will inhibit system 10 such that control of the low beam headlamps is determined by the headlamp switch. Second, override circuit 16 will also sense activation of the vehicle's high beam headlamps by the conventional headlamp switch and, upon doing so, will prevent system 10 from activating the low beam headlamps.

Logic circuit 15 accepts sensing signals from first, second, and third voltage sensors 12, 13, and 14 as well as system override signals from override circuit 16. Using a predetermined logic matrix as more specifically discussed below, logic circuit 15 will then generate low beam headlamp beam on and off control signals in response to the various combinations of sensing signals and device override signals. These low beam headlamp on and off control signals are then transmitted to electronic switch Q1 through buffer stage 18.

Further, a system bypass switch SW1 is preferably included to allow the owner of the vehicle to easily disable operation of system headlamps will be controlled high and low beam headlamps will be controlled exclusively by the vehicle's conventional headlamp switch.

DETAILED OPERATIONAL DESCRIPTION

FIGS. 7 and 8 provide greater schematic detail of a preferred embodiment of the system 10 of FIG. 1. Generally, a battery sense voltage is obtained from the ungrounded terminal of the vehicle's battery, filtered and then monitored by a control circuit for specific operational voltage levels and also for voltage transitions that indicate engine start and stop conditions. The results of the monitoring are logically summed and generate the on and off control signals that drive the electronic headlamp switches. The electronic headlamp switches are supplied directly from the battery and drive the headlamp low beam filaments only. Provisions are made to retain the normal lighting functions which override the automatic lighting function.

Battery sense voltage is obtained from the vehicle's battery through power cable 41 and is supplied to master module 30 through pin 1 of connector J4. The battery sense voltage is conditioned by a low pass filter established by resistor R21 and capacitor C3 which removes undesired high frequency noise and voltage transients caused by vehicle accessories being switched off and on. This conditioned battery sense voltage is applied through resistors R20 and R16 to the input to of a first voltage sensor, preferably a voltage slope detector defined primarily by operational amplifier U1D and its associated biasing and feedback components. The filtered battery sense voltage is also applied, through resistors R13 and R28, to the input of a second voltage sensor, preferably a lower voltage detector defined primarily by comparator U1C and its associated components, and through resistors R11 and R9 to the input of a third voltage sensor, preferably a higher voltage detector defined primarily by comparator U1B and its related components.

Comparator U1D functions as a comparator, to detect voltage changes that indicate engine starting and stopping so that system can turn the vehicle's low beam headlamps on and off in response. Resistor R20 and capacitor C1 form a second low-pass filter to provide a further stabilized or delayed battery sense voltage at the input to comparator U1D. This further filtered battery sense voltage is compared with an unfiltered reference voltage produced at the connection of resistors R19 and R15. Resistor R17 provides compensation for input offset current at comparator U1D. Resistors R23 and R16 establish hysteresis in the operation of U1D.

Prior to engine start, capacitor C1 has charged to the battery sense voltage seen at the junction of resistors R21 and R20. This voltage is also seen at R19. R19 and R15 form a voltage divider that applies 90% of the battery sense voltage to the negative input side (pin 8) of comparator U1D. At engine start, the battery sense voltage drops significantly, typically −3V or 25%. This voltage drop is presented immediately at comparator U1D pin 8, but, because of the filtering action of capacitor C1, the voltage drop is not immediately sensed at comparator U1D, pin 9. Therefore, the voltage at pin 8 of comparator U1D drops below the voltage at pin 9 and causes the output of comparator U1D to go to a high impedance state due to its open collector output stage. Pin 9 of comparator U1D will now see the same voltage produced at capacitor C1. Thus, the output state of comparator U1D is always forced high at engine start. This condition ensures that the automatic operation of the low beam headlamps will be disabled during engine starting.

After the engine has started, the battery sense voltage increases significantly. This voltage increase is supplied immediately to pin 8 of comparator U1D, but delayed at pin 9 of comparator U1D by the action of capacitor C1, thereby allowing the voltage at resistor R17 to exceed the voltage at pin 9. The output of U1D then goes low and current flows through R23 to the output of U1D. This decreases the voltage at pin 9 by approximately 20% and keeps the output (pin 14) low. This low condition indicates that the engine has started. Accordingly, sensing signal will be sent to the input (pin 7) of buffer comparator U1A for purposes of allowing the low beam headlights to be turned on.

Comparators U1B and U1C also function as comparators in conjunction with a voltage reference. Resistor R10 provides current limiting for zener diode Z1, a low current 5.0 VDC voltage reference. The reference voltage supplied by diode Z1 is used by comparators U1C and U1B to determine the absolute voltage level of the battery reference. Resistors R13 and R12 divide the battery sense voltage and apply it to the positive input of comparator U1C for comparison to the 5.0 volt reference provided by diode Z1 at the negative input of comparator U1C. The output of comparator U1C goes to a high impedance state when the sensed battery voltage reaches a predetermined appropriate level of system charge, indicating that the charging system has returned to normal operation immediately after engine start-up. This lower voltage level detection point is where the low beams will be activated if the engine start condition has been detected by the first voltage sensor. R26 provides hysteresis feed back for comparator U1C to prevent chattering at the switching threshold.

Comparator U1B performs a function similar to U1C except that it switches at a higher voltage level. Specifically, it serves as a backup in the event that engine start is not detected by comparator U1D, which could happen in a system with a weak charging system. If the battery sense (charge) voltage reaches the point set by comparator U1B, the low beam headlamps are activated, regardless of the output of comparator U1D. Resistors R11 and R18 form a voltage divider that sets the voltage at which the output of U1B will switch. This level is predetermined to correspond to a battery voltage which indicates that the vehicle's charging system has been operational for a period of time after engine start-up. Resistors R27 and R8 form a hysteresis circuit that causes the output of comparator U1B to go to a high impedance state at a lower battery sense voltage then that at which it switched low. A low at the output of comparator U1B indicates that the sense voltage has risen above the desired threshold and causes the low beam headlamps to be illuminated.

Bypass switch SW1 provides an override of the automatic functions of system 10. When switch SW1 is closed, voltage (disable signal) is summed through resistor R5 and the automatic function of system 10 is disabled.

Resistors R5, R4, R24, R6, R7, R25, R22, and R14 form a logic network by summing weighted sensing signals obtained from the outputs of the first, second, and third voltage sensors, of the override signals obtained from the override circuit which is connected to the vehicle's low and high beam power inputs from the headlamp switch, and the system disable signal from bypass switch SW1. Activation of the high and low beam headlamps occurs in accordance with the following truth table.

| | | | | | | | | | |
|---|---|---|---|---|---|---|---|---|---|
| Start Sense | 0 | 0 | 0 | 1 | 1 | 1 | X | X | X |
| Lower Voltage Sense | 0 | 1 | 1 | 0 | 1 | 1 | X | X | X |
| Upper Voltage Sense | 1 | 1 | 0 | 1 | 1 | 0 | X | X | X |
| Low Beam In | 0 | 0 | 0 | 0 | 0 | 0 | 1 | 0 | 1 |
| Hi Beam In | 0 | 0 | 0 | 0 | 0 | 0 | 0 | 1 | 1 |
| SW1 | OP | OP | OP | OP | OP | OP | OP | OP | OP |
| (OP = Open, CL = Closed) | | | | | | | | | |
| Low Beam Filament | off | on | on | off | off | on | on | off | on |
| High Beam Filament | off | off | off | off | off | off | off | on | on |
| Start Sense | X | X | X | X | | | | | |
| Lower Voltage Sense | X | X | X | X | | | | | |
| Upper Voltage Sense | X | X | X | X | | | | | |
| Low Beam In | 0 | 1 | 0 | 1 | | | | | |
| Hi Beam In | 0 | 0 | 1 | 1 | | | | | |
| SW1 | CL | CL | CL | CL | | | | | |
| Low Beam Filament | off | on | off | on | | | | | |
| High Beam Filament | off | off | on | on | | | | | |

A system override circuit is provided to allow for conventional activation of the headlamp high and low beams. Current flows through diode D1 and resistor R4 when the vehicle's high beams are activated conventionally, as determined by high beam power being supplied to pins J1 and J6 of wiring harness cable input connector 11b. This forces the low beams off when the high beams are activated during normal operation. Similarly, when the headlamp low beam switch is turned on conventionally, headlamp high beam power is supplied at pins J2 and J7 of connector 11b, causing current flow through diode D2 and forcing the low beams on during normal operation. Diodes D1 and D2 also provide isolation of the system 10 circuitry from the vehicle's original lighting system.

Comparator U1A provides the summing nodes and the headlamp low beam on and off signals for the electronic switch Q1b on master module 30 and, through control cable 40, to electronic switch Q1a on slave module 20. Preferably, the electronic switches Q1a and Q1b are high power field effect transistors, such as type IRF9Z34 from International Rectifier Corporation. Resistors R1a,b and R3a,b form a voltage divider that keeps the gates of switches Q1a and Q1b within safe operating limits. When the output of comparator U1A at pin 1 is low, switches Q1a and Q1b are on and current flows from the battery supply, through pins J4–3 (master module) and J4–4 (slave module) of connector J4b to the respective headlamp low beam filaments.

Comparators U1A, U1B, U1C, and U1D can be packaged together such as by using an industry standard LM339 quad comparator device.

Figure 2:
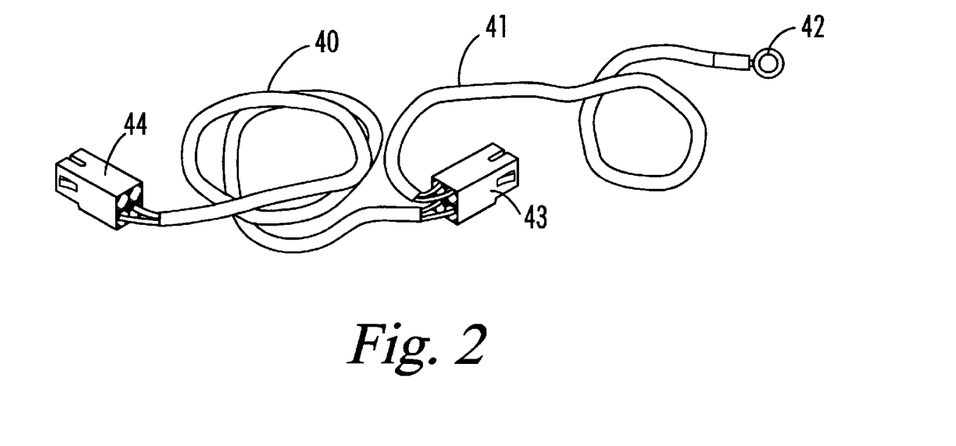
FIG. 2 is a perspective view of the control cable used to interconnect the master module and slave module portions of the automatic headlamp activation system.

Another novel feature of the automatic headlamp activation system 10 of this invention is its mechanical design which allows it to be easily installed in virtually any make and model of existing motor vehicle. The mechanical components of system 10 are particularly illustrated on FIGS. 2–6. FIG. 2 shows control cable 40 assembly which connects the control output of master module 30 to the control input of slave module 20, allowing the control circuitry to operate each headlamp while using the vehicle's existing headlamp wiring harness. FIG. 2 also shows as part of control cable assembly 40 a power cable 41 having at its battery end a battery terminal connector 42 which attaches to the ungrounded terminal on the vehicle battery. The connector end of power cable 41 terminates at control cable connector 43 which connects to master module 30, and electrically corresponds to pins J4–1 and J4–3 at master module connector J4b. Power cable 41 also supplies battery power directly to slave module 20, through control cable 40.

Figure 3A:
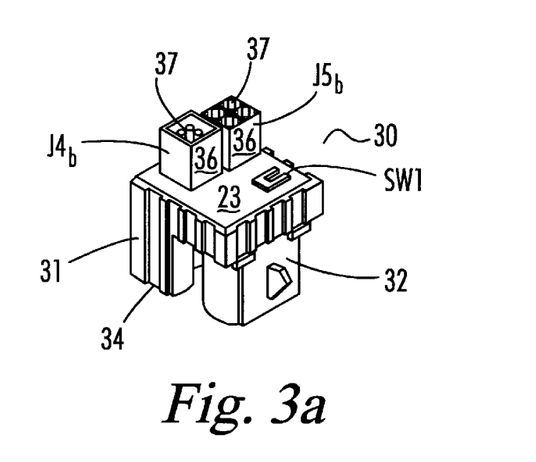
FIG. 3a is a perspective view of the master module housing used in a first embodiment of the headlamp activation system which is particularly adapted for use with vehicles having halogen headlamps having an axial plastic pre-focus lamp base design.
Figure 3B:
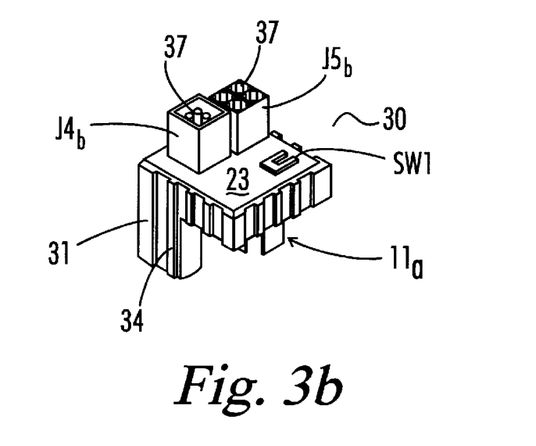
FIG. 3b is a perspective view of the master module housing used in a second embodiment of the headlamp activation system which is particularly adapted for use with vehicles having sealed beam incandescent/halogen headlamps with a three contact lug lamp base design.

Two embodiments of master module 30 are shown in FIGS. 3a and 3b. FIG. 3a illustrates a configuration for master module 30 which will allow for easy installation in automobiles having halogen headlamp types 9004 or 9007 and which have axial plastic pre-focused base designs. The master module 30 of FIG. 3b would be used with vehicles having sealed beam incandescent/halogen headlamps types H4656, H5006, H6054, H6024, and 9003, with three contact lugs on the lamp base. The electronic components of system 10 which are incorporated in master module 30 (FIG. 7) are mounted within a master module housing 31. Base 33 (FIG. 6) of master module housing 31 includes three connector lugs 35 (FIG. 6) which form the electrical contact portion of wiring harness cable input connector 11b. Most of the electronic components shown on FIG. 7 associated with master module 30 are surface mounted on a circuit board (not shown) with the larger components, such as capacitors C1 and C3, and switch Q1b extending upwardly from base 33. Housing cover 34 of master module housing 30 engages and fits over base 33. A connector cover 32 then attaches to housing cover 34 to seal master module 30 against harsh environmental conditions found inside the engine compartment of the vehicle. The outer facing surface of base 33 of master module housing 31 includes cable output connector J4b (FIG. 3a) having plurality of electrical connector pins 37 surrounded by connector housing 36. Connector pins 37 of connector J4b electrically correspond to pins J4–1, –2, –3, and –4 on FIG. 7.

Figure 5A:
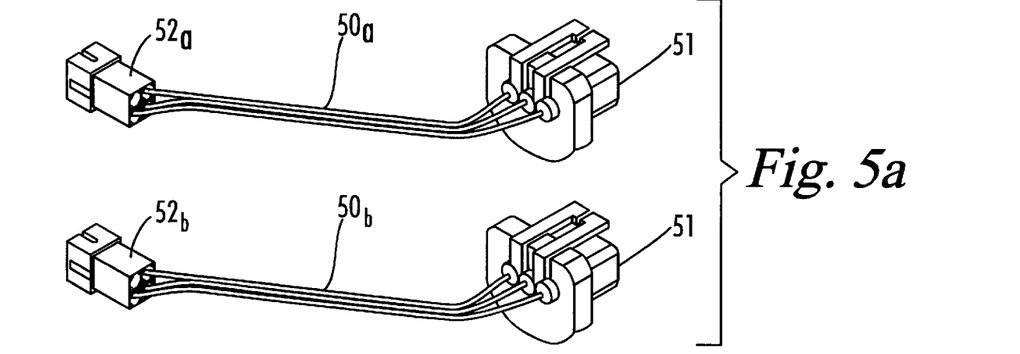
FIGS. 5a and 5b are perspective views of the headlamp power cables used in the first and second embodiments of the system of the present invention.
Figure 5B:
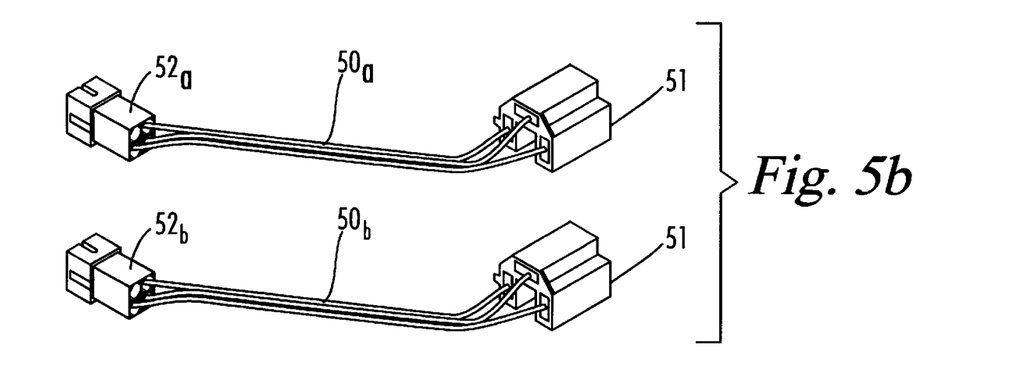

Similarly, connector J5b, also including a housing 36 which encloses connector pins 37, is formed as part of the master module housing 31 to establish the connection point for the headlamp power output cable 50b. The connector pins 37 on connector J5b electrically correspond to pins J5–1, –2, and –4 on FIG. 7. Connector J5b receives headlamp power cable input connector 52b (FIGS. 5a or 5b).

Bypass switch SW1 is also mounted on the outer facing surface of base 33 of housing 31 to afford easy access by the vehicle owner.

As seen on FIGS. 4a and 4b, the mechanical design of slave module 20 is similar to that of master module 30, having a two part housing 21 comprising a base 23 and a cover 24. Connectors J4a and J5a, each having connector pins 37 enclosed by a rectangular connector housing 36, are attached to or formed as part of the outer facing surface of base 23. Connector pins 37 of connector J4a electrically correspond to pins J4–2, –3, and –4 on FIG. 8. Connector pins 37 on connector J5a electrically correspond to pins J5–1, –2, and –4 on FIG. 8. Connector J5a receives headlamp power cable input connector 52a (FIGS. 5a or 5b).

In the embodiment of slave module 20 shown in FIG. 4b, a connector cover 22 is also supplied. The mechanical designs of the slave module embodiments of FIGS. 4a and 4b correspond to the master modules of FIGS. 3a and 3b respectively.

Although mechanical designs of the master and slave modules 30 and 20 have been presented for two of the most common headlamp base configurations, these designs can be modified to adapt system 10 to other base configurations without departing from the scope of this invention. Preferably, the size of the module housings 31 and 21 will be of minimal size and not substantially larger than the existing vehicle wiring harness connectors, typically 1¼ inches square, to allow for easy, non-intrusive installation.

Thus, although there have been described particular embodiments of a new and useful automatic activation system for motor vehicle headlamps, it is not intended that such references be construed as limitations upon the scope of this invention except as set forth in the following claims. Further, although there have been described certain dimensions and component values used in the preferred embodiment, it is not intended that such dimensions be construed as limitations upon the scope of this invention except as set forth in the following claims.

What is claimed is:

1. In a motor vehicle which has been factory equipped with an engine, a vehicle electrical and charging system, and having headlamps each attached to a standard factory supplied headlamp base, each headlamp base having a standard base connector for removably receiving a cable connector, a headlamp wiring harness having a harness connector which removably attaches to the headlamp base connector and electrically connects the headlamps to the vehicle electrical and charging system, and a battery having an ungrounded battery terminal, an automatic headlight activation system for retrofitting in the vehicle comprising:

a. a master module having a harness input connector means for mechanically and electrically connecting the activation system directly to the headlamp wiring harness through the harness connector on the headlamp wiring harness such that no modification of or splicing to the headlamp wiring harness or harness connector is required, a control circuit, and a control output;

b. a slave module having a control input and a first headlamp power output;

c. a control cable which electrically connects the master module control output to the slave module control input;

d. a first headlamp power output cable which electrically connects the first headlamp power output to at least one of the headlamps, the first headlamp power output cable including a first headlamp power output cable removable connector means for mechanically and electrically connecting the first headlamp power output cable directly to at least one of the headlamp base connectors such that no modification of or splicing to the headlamp base or base connector is required;

e. power input connector means for electrically connecting the vehicle electrical and charging system to the activation system; and f. whereby the control circuit is integral to the master and slave modules and includes means to automatically activate the headlamps in response to operation of the vehicle engine.

2. The headlamp activation system of claim 1 wherein the master module further comprises a second headlamp power output and the system further comprising second headlamp power output cable means to electrically connect the second headlamp power output to at least one of the headlamps, the second headlamp power output cable means including a second headlamp power output cable removable connector means for mechanically and electrically connecting the second headlamp power output cable means to one of the headlamp base connectors.

3. The headlamp activation system of claim 2 wherein the power input connector means comprises a power input cable having at a first end a battery terminal connector means for mechanically and electrically connecting the power input cable to the ungrounded battery terminal.

4. The headlamp activation system of claim 3, the master module further comprising a battery voltage input connector means for electrically connecting the master module to the second end of the power input cable.

5. The headlamp activation system of claim 4, the slave module further comprising a power input means for electrically connecting the power input connector means to the ungrounded battery terminal through the power input cable.

6. The headlamp activation system of claim 5 wherein the master module comprises a master module housing and wherein the harness input connector means comprises a harness cable input connector attached to the master module housing and having a harness cable input connector housing and connector pins which are arranged to mechanically and electrically receive the harness connector on the headlamp wiring harness.

7. The headlamp activation system of claim 6 wherein the slave module comprises a slave module housing and a first power output cable connector attached to the slave module housing, the first power output cable connector having a power output cable connector housing and connector pins which are arranged to mechanically and electrically receive a second removable power output cable connector on the first power output cable.

8. The headlamp activation system of claim 7 wherein the control cable comprises first and second control cable connectors, the master module further comprises a control cable output connector having a housing and connector pins which are arranged to receive the first control cable connector, and the slave module further comprises a control cable input connector having a housing and connector pins which are arranged to mechanically and electrically receive the second control cable connector.

9. The headlamp activation system of claim 8 wherein the slave module further comprises a first headlamp power switching circuit which includes means to receive and respond to control signals generated by the master module control circuit and transmitted to the slave module through the control cable, and the master module further comprises a second headlamp power switching circuit which includes means to receive and respond to control signals generated by the master module control circuit.

10. A motor vehicle headlamp activation system kit for retrofit installation in a motor vehicle comprising:

a. electronic switch means for selectively turning headlamp low beams in a vehicle in which the kit is installed on and off in response to low beam activation and de-activation control signals;

b. electronic headlamp control means to generate a low beam activation signal when an engine associated with the motor vehicle in which the kit is installed is running and to generate a low beam de-activation signal when the vehicle engine is not running;

c. first cable means to mechanically and electrically connect the headlamp control means to a battery charging system associated with the vehicle; and d. second cable means to mechanically and electrically connect to a standard equipment output connector on a headlamp power supply harness supplied with the vehicle and to a standard headlamp base in the vehicle and to electrically interrupt and replace an existing electrical connection between the headlamp low beams and a standard headlamp switch supplied with the vehicle, without modification of or splicing to the headlamp power supply harness.

11. The kit of claim 10, the first cable means further comprising power cable means to electrically connect the electronic switch means to the battery.

12. The kit of claim 11 wherein the electronic headlamp control means is mounted inside a master module which is not substantially larger than the harness output connector, the electronic switch means is mounted inside a slave module which is mechanically separate from the master module and which is not substantially larger than the master module, the kit further comprising third cable means for electrically transmitting the low beam activation and de-activation signals from the master module to the slave module.

13. The kit of claim 12 further comprising means to allow conventional activation of the headlamp high beams independent of the electronic control means and said headlamp control means including means to generate a low beam de-activation signal when the high beams are conventionally activated.

14. The kit of claim 13 further comprising bypass switch means for allowing conventional operational control of the high and low beams after the kit is installed in the vehicle.

15. The kit of claim 13 the headlamp control means further comprising override circuit means to allow for conventional activation of the low beams by the headlamp switch.

16. The kit of claim 13, the electronic control means comprising means to detect vehicle engine operation by electrically sensing operation of the battery charging system.

17. A device for automatic activation of low beam headlamps in a conventional motor vehicle, the device comprising:

a. a control circuit including control circuit sensor means to electrically detect battery voltage conditions in a battery charging system associated with the vehicle, and logic circuit means to generate low beam on and off control signals in response to the charging circuit sensor means;

b. first switch means operatively connected to the control circuit to turn at least one of the low beam headlamps on and off in response to the low beam on and off control signals;

c. device override circuit means to generate a device override signal in response to selection of the low beam headlamps by a headlamp switch in the vehicle;

d. the control circuit sensor means comprises a first voltage sensor means to detect operation of the vehicle charging system;

e. first voltage sensor means comprises start sensor means to detect an engine start voltage transition from a starting battery voltage associated with an engine that is being started to an increased battery voltage associated with an engine immediately after it has been started;

f. the control circuit sensor means further comprises a second voltage sensor means for detecting a lower battery voltage corresponding to proper operation of the battery charging system while the engine is running; and g. wherein the control circuit sensor means further comprises a third voltage sensor means for detecting a higher battery voltage associated with proper operation of the battery charging system while the engine is running.

18. The device of claim 17 further comprising second switch means operatively connected to the control circuit to turn one of the low beam headlamps on and off in response to the low beam on and off control signals.

19. The device of claim 18 further comprising means to inhibit activation of the low beam headlamps by the device while the engine is being started.

20. The device of claim 18 wherein the logic circuit means is operatively connected to each of the first, second, and third voltage sensor means and to the device override circuit means and the logic circuit means generates the low beam on and off control signals in response to pre-set combinations of sensing signals generated by the first, second, and third voltage sensor means and in response to the device override signal.

21. The device of claim 18 further comprising circuit means to allow for activation of vehicle high beam headlamps by the vehicle headlamp switch and to inhibit activation of the low beam headlamps by the device when the high beam headlamps are activated by the vehicle headlamp switch.

22. The device of claim 21 further comprising bypass switch means to inhibit automatic operation of the device.

23. The device of claim 21 wherein the first and second electronic switch means comprise electronic switches and includes means to switch the battery voltage directly to the headlamp low beams through the electronic switches.

24. An automatic motor vehicle headlamp activation system comprising:

a. headlamp power cable means to connect the system in series between an existing headlamp activation circuit in the vehicle and headlamp bases in the vehicle by plugin connection to cable output connectors on an existing wiring harness in the vehicle and to existing base connectors on the headlamp bases;

b. battery power cable means to connect the system to an existing vehicle battery; and c. a control circuit which provides an activation signal to headlamps in the vehicle in response to operation of a vehicle engine.

25. The system of claim 24 wherein the control circuit is integral to the headlamp power cable means.

* * * * *